No. 743,441. PATENTED NOV. 10, 1903.
H. BROOKS.
ELECTRIC TERMINAL.
APPLICATION FILED JUNE 20, 1902.
NO MODEL.
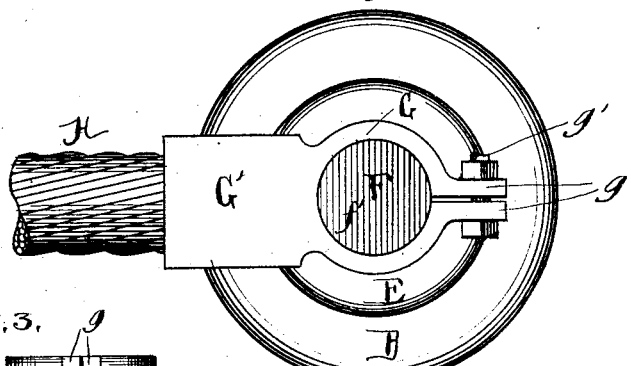
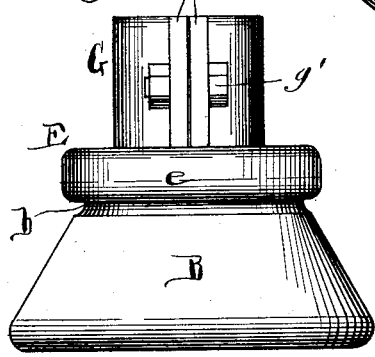
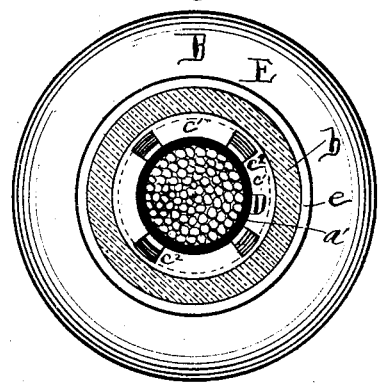
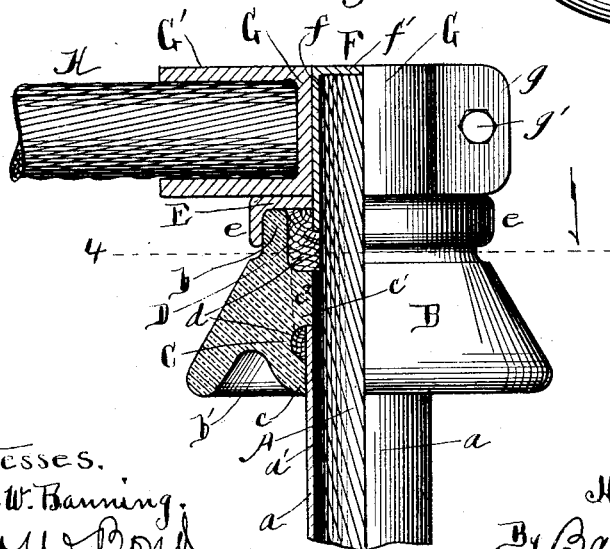
Witnesses.
Samuel W. Banning.
Oscar W. Bond.
Inventor.
Howard Brooks.
By Banning & Banning
Attys.

No. 743,441. Patented November 10, 1903.

UNITED STATES PATENT OFFICE.

HOWARD BROOKS, OF WHEATON, ILLINOIS, ASSIGNOR OF TWO-THIRDS TO GEORGE W. BROWN AND JOHN C. MASTICK, OF WHEATON, ILLINOIS.

ELECTRIC TERMINAL.

SPECIFICATION forming part of Letters Patent No. 743,441, dated November 10, 1903.

Application filed June 20, 1902. Serial No. 112,496. (No model.)

*To all whom it may concern:*

Be it known that I, HOWARD BROOKS, a citizen of the United States, residing at Wheaton, in the county of Dupage and State of Illinois, have invented a certain new and useful Improvement in Electric Terminals, of which the following is a specification.

This invention relates to terminal connections between a main cable or conductor for an electric current and a branch cable or conductor leading to a third rail or other appliance to be supplied with the electric current. It is desirable and necessary in terminals of this character to have a perfect insulation assured at the juncture of the terminal cable or conductor with the main cable or conductor, and it is also a requisite that the connection and insulation shall result in the perfect sealing of the end of the main cable or conductor, and at the same time the connection should be such as to enable the insulator and the terminal socket-clamp to be readily and quickly removed without any liability of destroying the covering for the cable or conductor or breaking the insulation.

The objects of this invention are to construct a terminal connection simple in its nature and capable of insuring a perfect insulation and sealing of the end of the main cable or conductor; to effectually close the end of the main cable or conductor against moisture and present a good contact-surface; to inclose the end of the main cable or conductor with a thimble having the same outside diameter as that of the insulation around the cable or conductor, which permits the soldering to be done before the insulator or fittings are attached; to enable the socket-clamp for the terminal cable to be readily detached without disturbing the insulation and also to allow the insulator to be repaired or renewed without disturbing the soldering connection; to retain the insulator in position at all times and avoid the liability of the seal or insulation being broken when attaching the cable or conductor and its socket-clamp; to readily flow the insulating compound around the main cable or conductor within the insulator and have the compound furnish a watertight seal on the end of the main cable or conductor; to use a construction of insulator and a terminal socket-clamp which requires but a minimum amount of cable and material in their manufacture, and to simplify and improve generally the construction of the terminal connection as a whole.

The invention consists in the features of construction and combination of parts hereinafter described and claimed.

In the drawings, Figure 1 is an end elevation of the electric terminal, showing the insulator and the terminal socket-clamp; Fig. 2, a plan view, partly in section, showing the main cable or conductor, its coverings of lead and insulating material, the insulator, the insulating compound within the insulator, the cap receiving the end of the insulator, the terminal socket-clamp and the terminal cable or conductor; Fig. 3, a side elevation of the insulator, the receiving cap or plate for the end of the insulator, and the socket-clamp for the terminal cable or conductor; and Fig. 4, a cross-section on line 4 of Fig. 2 looking in the direction of the arrow with the insulating compound removed.

The main cable or conductor A can be of any ordinary and usual form or construction, having, as shown, an outer casing or cover $a$, of lead, and an inner casing or cover $a'$, of rubber or other insulating material, the end of the main cable or conductor only being shown. The insulator B may be made of porcelain, vulcanite, or other suitable material and may be of the form represented or other suitable form. As shown, the exterior is of a taper formation, and at one end the insulator has an annular rim or neck $b$ and at the other end has a groove or depression $b'$, as usual. The insulator has therethrough an axial hole or opening, the outer end of which is of a diameter for the passage of the full diameter of the main cable or conductor with its casings or coverings, and near the end is a circumferential groove or recess C, leaving a circumferential bearing-face $c$ to abut against the lead covering $a$ of the cable or conductor, as shown in the section of Fig. 2. The other end of the insulator has therein a circumferential groove or recess D, and between the two grooves or recesses are lugs or bearing-faces $c'$, which contact or bear against the insulating-covering $a'$, with the end of the lead covering abutting against the end face of the lugs on the side adjacent to the groove or recess C, as shown in the sectioned portion of Fig. 2. The wall for the lugs $c'$ is cut away at intervals, forming passages or openings $c^2$, which furnish a communication between the groove or recess C and the groove or recess D for the admission of the insulating compound to the groove or recess C when the insulating compound is poured into the groove or recess D for sealing the end of the lead covering of the main cable or conductor and preventing the entrance of moisture at that point to affect the cable or conductor. The insulating compound $d$ can be any suitable material capable of being poured into the grooves or recesses and when entered furnishes an insulation around the main cable or conductor at the terminal end within the insulator at both ends thereof. The casings or coverings at the terminal end of the main cable are cut away at a distance to have the end face of the shoulders or lugs $c'$ abut against the end of the outer lead casing or covering of the cable or conductor and to have the end of the inner insulating-covering $a'$ terminate at or approximately at the opposite face of the lugs, so that when the insulating compound $d$ is poured into the grooves or recesses the compound in the groove or recess C will encircle and contact the end of the lead covering $a$ and the compound in the groove or recess D will encircle and contact the surface of the main cable or conductor, as shown in the sectioned portion of Fig. 2.

The annular rim or neck $b$ of the insulator B is entered into the circumferential wall $e$ of a cap or plate E, which cap or plate and its circumferential wall furnish a protection to the rim or neck against being easily cracked or broken, so as to destroy the insulator. The extreme end of the main cable or conductor is entered into a thimble F, having an annular wall $f$ and a closed end or head wall $f'$, the thimble having an interior diameter to receive the end of the main cable or conductor and an exterior diameter corresponding to the diameter of the cable and its inner covering $a'$ of insulating material. The length of the body or wall $f$ of the thimble is one that when the thimble is entered on to the end of the cable or conductor the end of the body or wall $f$ will project into the insulating compound in the groove or recess D, the end of the thimble passing through the cap or guard plate E, so as to have the sealing compound around the end of the thimble. The thimble is to be entered on the end of the cable or conductor and soldered thereon in the usual way, and by having the exterior of the thimble of a less diameter than the full diameter of the cable or conductor with its two casings or coverings the insulator can be applied to or withdrawn from the end of the cable or conductor without destroying or disturbing the soldering of the thimble to the cable or conductor, which is of great benefit and advantage in the construction of terminals.

The thimble F is entered into a socket G, split on one side and having on each side of the split an ear $g$, through which a clamping-bolt $g'$ passes, so that the socket is, in effect, a clamp into which the thimble attached to the end of the cable or conductor can be entered and be firmly secured therein by tightening the clamping-bolt. A socket $G'$ is formed with the clamp-socket G and receives thereinto the end of the terminal cable or conductor H, the end only of such terminal cable or conductor being shown.

The terminal connection is made by cutting away the lead covering $a$ of the main cable or conductor to the distance required and then cutting away the inner casing or cover, but to a less distance than the lead covering is cut away. The thimble F is inserted on the end of the main cable or conductor and soldered thereon, as usual. The insulator B is slipped on to the cut-away end of the main cable or conductor until the end face of the lugs or shoulders $c'$ abuts against the end of the lead covering, with the inner covering of insulating material in contact with the peripheral faces of the lugs or shoulders. The end of the cable is raised or otherwise placed, so that the insulating compound $d$ in a fluid or liquid condition can be poured into the groove or recess D and flow through the openings or passages $c^2$ into the groove or recess C around the end of the lead covering, with the compound in the groove or recess D around the cable or conductor. The protecting cap or plate E is slipped on to the end of the cable or conductor for the annular rim or flange of the insulator to enter within the annular rim or flange of the protecting cap or plate, and the socket-clamp, with the end of the terminal cable or conductor therein, is slipped onto the thimble F and securely clamped thereon by turning the clamping-bolt $g'$ to draw together the sections of the divided socket. The terminal connection can be disconnected for testing, repairing, or other purposes by simply loosening the clamping-bolt of the socket-clamp, which permits the terminal cable or conductor to be withdrawn from the main cable or conductor, and when the terminal cable or conductor is withdrawn the protecting or guard cap or plate can be slipped off, and, if necessary, the insulator can be likewise slipped off, or if the insulating compound is to be renewed such compound can be entered into the grooves or recesses by pouring it into the groove or recess D to flow through the openings or passages $c^2$ into the groove or recess C to fill the two grooves or recesses.

It will be seen that the terminal connection of this invention is exceedingly simple in construction and at the same it will be found effectual in insulating and sealing the terminal, as the insulator has therein the insulating compound around the body of the cable or conductor and also the insulating compound around the end of the lead covering, thus preventing the entrance of moisture to affect the transmission of the current and fully protecting the cable or conductor at the terminus of the lead covering, as well as at the end of the insulator around the body of the main cable or conductor. The insulator, by reason of its interior grooves or recesses, effects a perfect insulation and sealing of the end of the main cable or conductor, including the end of the lead covering. The insulator is held in position so that the seal is not readily broken in attaching the terminal cable or conductor by the contact of the lugs or shoulders on the interior of the insulator with the inner covering of insulating material. The insulator can be removed and replaced and if broken can be renewed without destroying or unsoldering the terminal thimble. The terminal thimble, in connection with the insulator and its interior grooves and recesses for receiving the insulating compound, insures a water-tight seal for the terminal end of the main cable or conductor. The terminal connection can be disconnected for testing or other purposes without breaking or destroying the insulating seal for the end of the main cable or conductor, and the construction of the terminal connection as a whole is one which requires only a minimum amount of cable and material. All these advantages found in the terminal connection of the invention add greatly to its utility and effect a great saving of time and labor in examining, connecting, disconnecting, repairing, or testing the terminal.

What I regard as new, and desire to secure by Letters Patent, is—

1. In an electric terminal, the combination of a main conductor, an insulator provided with a hole or passage through which the main conductor extends and beyond which it projects, having its interior provided with communicating circumferential grooves or recesses one of which opens to the end of the insulator and the other one of which is located within the body of the insulator, for the reception of an insulating compound in both of the grooves or recesses, and an insulating compound filled into the grooves or recesses, substantially as described.

2. In an electric terminal, the combination of a main conductor, an insulator having its interior provided with communicating circumferential grooves or recesses one of which opens to the end of the insulator and the other one of which is located within the body of the insulator, for the reception of an insulating compound in both of the grooves or recesses, an insulating compound filled into the grooves or recesses, and a protecting cap or plate fitting down over the recessed end of the insulator and entirely inclosing the insulating compound therein, substantially as described.

3. In an electric terminal, the combination of a main conductor having an inner covering of insulating material and an outer lead covering, an insulator having an axial hole for the passage of the cable and provided around the wall of the axial hole with communicating circumferential grooves or recesses, one of which opens to the end of the insulator, for the reception of an insulating compound, and an insulating compound filled into the grooves or recesses, substantially as described.

4. In an electric terminal, the combination of a main conductor having an inner covering of insulating material and an outer lead covering, an insulator having an axial hole for the passage of the end of the main conductor, a circumferential groove in the wall of the axial hole, a circumferential groove in the wall of the axial hole open to the end of the insulator, communicating openings or passages through the wall of the axial hole between the two grooves or recesses against one face of which the lead covering abuts and in line with the opposite face of which the inner insulating-covering terminates, and an insulating compound filled into the grooves or recesses for the compound in one groove or recess to contact the end of the lead covering and for the compound in the other groove or recess to contact the conductor, substantially as described.

5. In an electric terminal, the combination of a main conductor, a thimble inclosing the end of the main conductor, a clamp-socket into which the thimble is removably inserted, an insulator having in its end a circumferential groove or recess for an insulating compound, and an insulating compound filled into the groove or recess, substantially as described.

6. In an electric terminal, the combination of a main cable or conductor, a thimble inclosing the end of the main conductor, a clamp-socket into which the thimble is inserted to be detachable therefrom, a socket for the end of the terminal conductor, an insulator having in one end a circumferential groove or recess, and an insulating compound filled into the groove or recess, substantially as described.

7. In an electric terminal, the combination of a main conductor, a thimble inclosing the end of the main conductor, a clamp-socket receiving the thimble and detachable therefrom, an insulator having in one end a circumferential groove or recess into which the end of the thimble projects, and an insulating compound filled into the groove or recess around the end of the thimble and the main conductor, substantially as described.

8. In an electric terminal, the combination of a main conductor, a thimble inclosing the end of the main conductor, a clamp-socket receiving the thimble and detachable therefrom, an insulator having in one end a circumferential groove or recess into which the end of the thimble projects, an insulating compound filled into the groove or recess around the end of the thimble and the main conductor, and a protecting cap or plate on the end of the insulator around the groove or recess, substantially as described.

9. In an electric terminal, the combination of a main conductor, having an inner covering of insulating material and an outer lead covering, an insulator having an axial hole for the passage of the end of the main conductor, a circumferential groove in the wall of the axial hole, a circumferential groove in the wall of the axial hole open to the end of the insulator, a passage or opening in the wall of the axial hole of the insulator between the circumferential grooves or recesses against one face of which the end of the lead covering abuts and in line with the other face of which the inner insulating covering terminates, an insulating compound filled into the grooves or recesses for the compound in one groove or recess to contact the lead covering and for the compound in the other groove or recess to contact the main conductor, a protecting cap or plate surrounding the end of the insulator having the circumferential groove or recess therein, a thimble inclosing the end of the main conductor with its end projecting through the cap or plate and into the circumferential end groove or recess, a clamp-socket receiving the thimble and detachable therefrom, a socket receiving the end of the terminal conductor, and a terminal conductor, substantially as described.

HOWARD BROOKS.

Witnesses:
THOMAS A. BANNING,
OSCAR W. BOND.